Oct. 6, 1964    G. T. LYON    3,151,893
TUBE COUPLING
Filed May 25, 1960    2 Sheets-Sheet 2
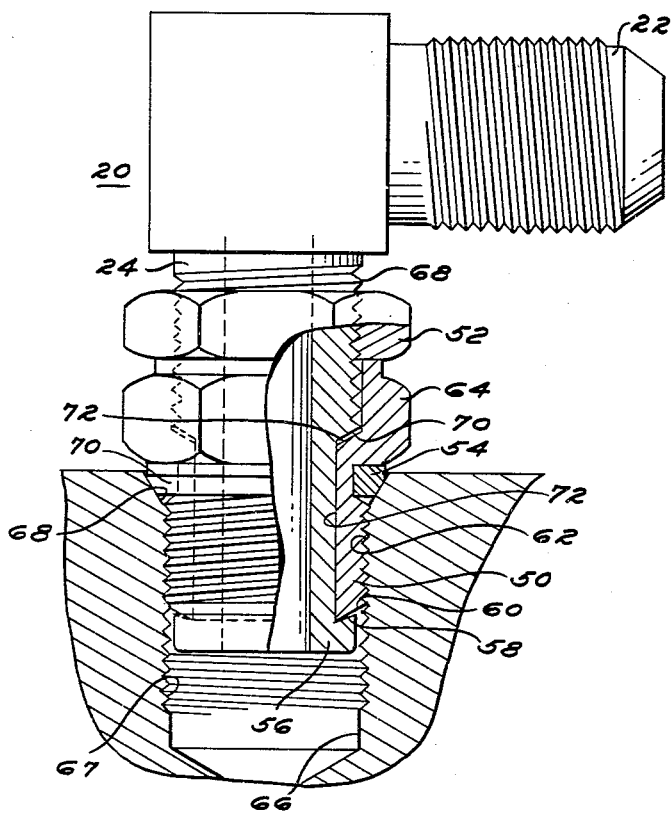
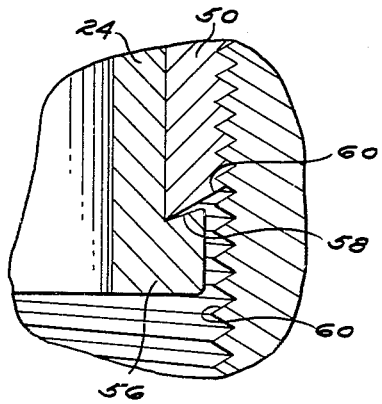
INVENTOR.
GILBERT T. LYON
BY
Burton & Parker
ATTORNEYS

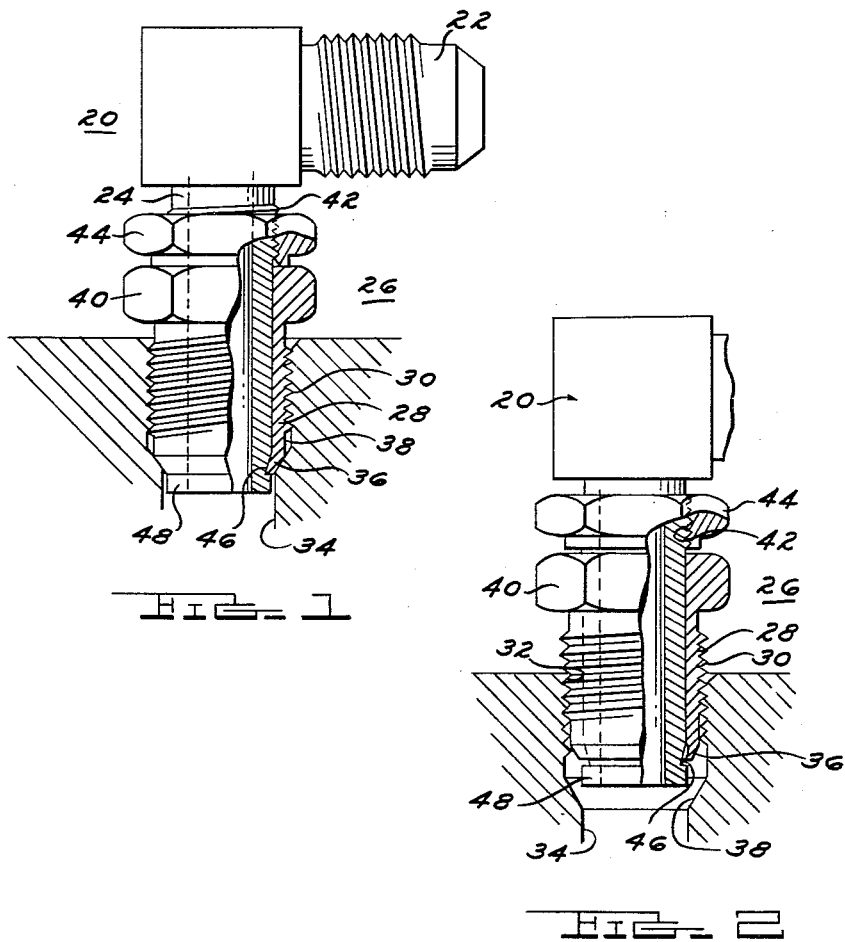

United States Patent Office 3,151,893
Patented Oct. 6, 1964

3,151,893
TUBE COUPLING
Gilbert T. Lyon, Royal Oak, Mich., assignor to L & L Manufacturing Company, Warren, Mich., a corporation of Michigan
Filed May 25, 1960, Ser. No. 31,660
3 Claims. (Cl. 285—158)

This invention relates to fluid pressure couplings and particularly to couplings of angular shape having a longitudinally extending fluid-conducting portion and a laterally extending fluid-conducting portion, such as T's or L's, and which coupling may be threadedly connected in tight sealing relation in a fluid pressure system without the necessity of swinging the laterally projecting portion of the coupling.

More particularly, the coupling comprises a tubular body portion upon which is mounted an externally threaded sleeve. This sleeve is adapted to be threadedly engaged within the threaded port of a fluid-containing member to establish communication therewith by the coupling. The body is rotatably and axially adjustable within the sleeve. The coupling includes a second tubular part which is angularly disposed with respect to the tubular body and communicates interiorly therewith. This second tubular part is relatively angularly adjustable with respect to the tubular body. It is common practice to threadedly couple the coupling into the port of the fluid-containing member by rotating the coupling as a unit, but such rotation of the entire coupling may not be feasible due to obstructions imposed by other parts of the system. The sleeve portion mounted upon the tubular body may therefore be independently rotated while so mounted on the body to establish communication of the member provided with the port. The second tubular part of the coupling may then be adjustably rotated with respect to the first tubular part to bring them into the required angular relationship for the connection of the second tubular part into the system.

The sleeve and the body upon which the sleeve is mounted are then so relatively actuated as to form a tight seal between the sleeve and the body. A tight seal is also formed between the sleeve and a portion of the wall of the port into which the sleeve is threaded.

An object is the provision of a coupling of the character described wherein a tubular body extension of the coupling has a sleeve assembly relatively rotatably mounted thereupon, which sleeve assembly includes an externally threaded portion threadedly receivable within a threaded port in a fluid-containing member. The sleeve assembly is adapted to permit rotatable adjustment of the body therewithin to desired positions with respect thereto. The sleeve assembly is adapted to form a tight seal with the port to prevent fluid leakage therebetween. The sleeve assembly is also adapted to form a tight seal with the tubular body which it surrounds to form a fluid-tight seal therebetween.

Another object is the provision of a coupling of the character described wherein the sleeve assembly which is mounted upon the tubular body has a port-engaging end that is externally threaded to be adjustably threadedly received within the threaded port and has a wrench-engaging outer end to accomplish threading of the sleeve into the port, and which sleeve axially slidably receives the body but is rotatable thereabout. The port into which the sleeve is threaded is provided with an internal annular beveled portion that communicates with the threaded portion. The sleeve assembly includes a part adapted to be urged against the beveled portion of the port upon the threading of the sleeve thereinto and which forms a tight seal with the wall of the port to prevent leakage of fluid. The construction is such that the sleeve assembly is captively mounted upon the body against accidental separation therefrom prior to connecting the fitting in a fluid pressure system.

Another object is the provision of a coupling as hereinabove set forth wherein the sleeve assembly includes an externally threaded sleeve freely mounted upon the tubular body and the body itself is provided with an externally threaded portion adjacent its outer end upon which a nut is threaded independently of the sleeve. Rotation of this nut actuates the body within the sleeve and serves to establish a fluid-tight connection between the body and the sleeve, supplementing the fluid-tight connection formed between the sleeve and the wall of the port into the member.

A meritorious feature of the construction is that the body is provided with an annular external face portion adapted to be sealingly engaged with an annular face portion of the sleeve, and such face portion of the sleeve is adjacent to the port end extremity of the sleeve, and the engagement of such face portion of the sleeve and the body holds the sleeve captive upon the body.

Another feature of importance is that the beveled face portion of the port may be at the outer or inner end of the port. If at the outer end of the port, the sleeve may be provided with a sealing ring encircling the same, which is adapted to be urged against the beveled face portion of the port as the sleeve is threaded thereinto.

Other objects, advantages, and meritorious features will more fully appear from the specification, claims, and accompanying drawing wherein:

FIG. 1 is an elevation partly in cross section showing one modification of my invention mounted within the port of a fluid containing member and sealingly coupled therewith.

FIG. 2 is a side elevation partly in cross section of the construction shown in FIG. 1, showing the coupling of my invention at an intermediate stage of being mounted within the port of a fluid containing member but prior to sealing engagement therein.

FIG. 3 is a second modification of the invention as compared with FIGS. 1 and 2 showing the inclusion in the coupling of a sealing ring mounted upon the sleeve.

FIG. 4 is a fragmentary sectional view of a portion of the structure shown in FIG. 3, showing the sealing engagement between the tubular body and the port end of the sleeve.

In FIGS. 1 through 3 of the drawings there is shown a coupling embodying the invention. This coupling embodies an angular tubular fitting 20 having a tubular outwardly threaded extension 22 and a second tubular outwardly threaded extension 24. These two tubular extensions are disposed as shown in the drawing at a right angle with respect to each other and communicate interiorly through the interior of the body. The extension 24 is shown as embodying the invention. This fitting is adapted to be used in conjunction with fluid pressure systems where the extension 24 is designed to be received within the bore of a fluid containing member and to form a tight seal therewith. The extension 22 is adapted to be threadedly coupled with some other part of a fluid system. Frequently these couplings must be installed within close quarters. Furthermore, the two parts of the system with which the two legs of the coupling must be connected are located at varying angular positions so that it becomes necessary to swing the coupling with respect to the member within the port of which the leg 24 is received. The point at which the coupling must be inserted in the system may be so closely limited that it is not possible to rotate the coupling completely through three hundred and sixty degrees (360°) to accomplish the threading of the extension per se into the bore. For this reason the extension 24 which is adapted to be coupled within the bore is provided with a sleeve element indicated in FIG. 1 as 26.

This same element 26 has a tubular portion 28 which is externally threaded as at 30 to be threadedly received within the threaded portion 32 of a bore 34. The extreme port end of the sleeve is provided with a lip 36 hereinafter more particularly described. The bore itself is provided with a beveled sealing seat 38 hereinafter more particularly described. The outer end of the sleeve 28 is provided with a wrench-engaging or nut portion 40.

This sleeve is mounted upon the tubular extension 24 of the body as shown in FIGS. 1 and 2. This tubular extension 24 is externally threaded as at 42 as shown in FIGS. 1 and 2. There is threadedly mounted upon this threaded portion 42 an adjusting nut 44, which nut is internally threaded to be threadedly engaged on the threaded portion 42 of the body.

The body itself is of reduced diameter adjacent to the extremity of its port end as shown being undercut as at 46. Its undercut is spaced slightly from its extreme end because at the extreme end itself a radially projecting angular shoulder 48 against which such undercut tapered face 46 terminates, all as shown particularly in FIGS. 1 and 2.

The lip portion 36 of the sleeve 28 is swedged inwardly as shown in FIGS. 1 and 2 so that the shoulder 48 overhangs the end face of the lip as shown on such figures.

When the fitting is assembled in a system, the sleeve 26 is threaded into the threaded portion 32 of the port 34 of the member which is provided with the port. The angular tubular fitting 20 which is provided with extensions 22 and 24 has been adjusted to the desired angular position it will assume in the system, and the sleeve 28 is threaded down into the port to its desired position. At such position the lip extremity 36 of the sleeve is engaged with the beveled surface 38 of the port. As the threading is continued, this lip portion 36 is urged inwardly so that its inner face engages the tapered face 46 of the body while its outer face engages the beveled surface 38 of the port. The end face of the lip is engaged by the adjacent flat face of the shoulder portion 48 of the body as shown particularly in FIG. 1. The lip has such a thickness radially that the lip itself is squeezed between the body and the tapered face of the port and extends radially outwardly beyond the shoulder 48 as shown in FIG. 1.

When the sleeve has been threaded down to the point where the lip is squeezed between the tapered face 46 of the body and the beveled face 38 of the port, the nut 44 may be tightened down upon the body, drawing the radial face of the shoulder 48 tightly against the end face of the lip, all as shown in FIG. 1, forming a tight seal not only between the sleeve and the beveled wall of the port but between the sleeve and the body itself. The seal between the sleeve and the body is both between the inner annular face of the lip 36 and the tapered face 46 of the body and between the radial face of the shoulder 48 of the body and the end face of the lip.

The construction of FIGS. 3 and 4 differs in detail from that of FIGS. 1 and 2. In FIGS. 1 and 2, the sleeve assembly comprises the sleeve 28 per se plus the nut 44. In FIGS. 3 and 4, the sleeve assembly comprises the sleeve there indicated as 50, an adjusting nut there indicated as 52, and a sealing ring there indicated as 54. The body is indicated as 24 as it is in FIGS. 1 and 2.

This body is provided at its port extremity with a shoulder portion 56. This shoulder portion has a tapered face 58 which is opposed to a tapered face 60 on the end of the sleeve 50. This sleeve 50 is externaly threaded as at 62. It is provided at its outer end with a wrench-engaging nut portion 64. The port in the member is indicated as 66. It has a beveled face 68 at its outer end. The ring 54 has a beveled face 70 which is adapted to seat against the beveled face 68 of the ported member. The sleeve 50 has a circumferential groove or channel between its threaded portion 62 and the wrench-engaging portion 64 within which the sealing ring 54 is seated, all as shown in FIG. 3. The beveled face 70 of the sealing ring seats against the beveled entrance 68 of the port when the sleeve is threaded into the port. The threaded portion of the port is indicated as 67.

The body 24 has an outwardly threaded portion 68 adjacent its outer end. This outer threaded portion terminates in a tapered shoulder 70 toward the port end and that portion of the body between the tapered shoulder 70 and the radial shoulder 56 indicated as 72 is shown as of reduced diameter. The tapered shoulder 70 of the body is opposed to a tapered internal annular shoulder 72 of the sleeve as shown in FIG. 3.

When the sleeve 50 is threaded into the threaded portion 67 of the port as shown in FIG. 3, the sealing ring 54 is brought into sealing engagement with the beveled face 68 of the port as shown in such figure. The radial shoulder 56 at the port end extremity of the body is of less diameter than the adjacent extreme end of the sleeve. In other words, the sleeve overhangs radially the shoulder 56, all as shown in FIGS. 3 and 4. The construction is such that the tapered face 58 of the shoulder 56 of the body is in engagement with the end face 60 at the extremity of the sleeve.

When the nut 52 is rotatably adjusted about the threaded portion of the body, it draws the shoulder 56 of of the body up against the end face 60 of the sleeve so as to increase the seal at such point. The faces 70 and 72 of the body and the sleeve are likewise brought into contact to increase the seal formed between faces 58 and 60 of the body and sleeve respectively.

This fitting of FIGS. 3 and 4 will, it will be seen, be suitable for use to provide installation of this kind of a fitting in a close quarter placement within a fluid pressure system, and the tightening down of the parts to produce fluid-tight joints is capable of being accomplished by merely tightening the sleeve through engagement of its wrench nut portion 64 and by rotatably tightening nut 52. One does not have to rotate the entire fitting.

What I claim is:

1. A fluid pressure coupling for communicating connection with the port of a fluid containing member, said port having an annular threaded portion and an annular bevelled portion disposed adjacent to the inner end of the threaded portion, said coupling comprising, in combination, a tubular body having an inner end portion and an outer end portion, said outer end portion of the body being externally threaded, said inner end portion having an external annular undercut defining a sealing surface and an outwardly facing shoulder at the inner end of such undercut, a sleeve mounted upon and encircling the body for relative axial and rotatable adjustment of the body therewithin, said sleeve having an externally threaded intermediate portion, a wrench-engaging outer end portion, and an annular inner end sealing portion, said threaded intermediate portion of the sleeve threadedly received within the threaded portion of the port, said inner end sealing portion of the sleeve being disposed in confrontation with the undercut on said body and deflectable into the undercut when the sleeve is tightened into the port and having an annular external sealing surface adapted to be urged against and form a tight seal with the bevelled portion of the port at the inner end of the threaded portion thereof upon threading of the sleeve into the port, said inner end sealing portion of the sleeve also having a second annular sealing surface opposed to the annular external sealing surface at the inner end of the body, a nut threadedly mounted upon the external outer end portion of the body adjacent the outer end of the sleeve, said nut engaging said sleeve and being rotatable upon the body to draw the body outwardly with respect to the sleeve causing said shoulder to engage said sleeve and urge the second annular sealing surface of said inner end sealing portion of the sleeve against the opposed annular sealing surface of the body to form a tight seal therewith, and said inner end sealing portion of the sleeve springing outwardly away from said undercut upon loosening the sleeve in the port.

2. A fluid pressure coupling for communicating connection with the port of a fluid containing member as defined in claim 1 characterized in that the said inner end sealing portion of the sleeve comprises an axially extending lip, the outer surface of which constitutes the first-mentioned annular outer sealing surface and the inner surface of which lip constitutes the second-mentioned annular sealing surface opposed to the annular sealing surface of the body, said annular sealing surface of the body being inwardly tapered with the lip being radially compressed between the said bevelled portion of the port and said external sealing surface of the body.

3. A fluid pressure coupling for communicating connection with the port of a fluid containing member as defined in claim 1 characterized in that the said inner end sealing portion of the sleeve comprises an axially extending lip, the outer surface of which constitutes the first-mentioned annular outer sealing surface and the inner surface of which lip constitutes the second-mentioned annular sealing surface opposed to the annular sealing surface of the body, said annular sealing surface of the body being inwardly tapered with the lip being radially compressed between the said bevelled portion of the port and said external sealing surface of the body, and the body being provided at the inner end thereof with a laterally projecting annular shoulder which overhangs the inner end of the lip.

References Cited in the file of this patent
UNITED STATES PATENTS

| | | |
|---|---|---|
| 1,969,142 | McIntyre | Aug. 7, 1934 |
| 2,226,826 | Miller | Dec. 31, 1940 |
| 2,251,717 | Parker | Aug. 5, 1941 |
| 2,458,833 | Carignan | Jan. 11, 1949 |
| 2,459,643 | Hartley | Jan. 18, 1949 |
| 2,761,702 | Noel | Sept. 4, 1956 |
| 2,828,982 | Kennedy | Apr. 1, 1958 |
| 2,926,935 | La Marre | Mar. 1, 1960 |